United States Patent
Zachman et al.

(10) Patent No.: US 12,081,633 B2
(45) Date of Patent: *Sep. 3, 2024

(54) METHODS AND SYSTEMS FOR CONTENT DELIVERY USING SERVER PUSH

(71) Applicant: Comcast Cable Communications, LLC, Philadelphia, PA (US)

(72) Inventors: Cory Zachman, Denver, CO (US); Guy Grigsby, Denver, CO (US); Carl Veazey, Longmont, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,071

(22) Filed: Apr. 10, 2023

(65) Prior Publication Data
US 2023/0247105 A1    Aug. 3, 2023

Related U.S. Application Data

(63) Continuation of application No. 15/491,662, filed on Apr. 19, 2017, now Pat. No. 11,659,057.

(51) Int. Cl.
*H04L 67/55*    (2022.01)
*H04L 65/61*    (2022.01)
(Continued)

(52) U.S. Cl.
CPC ............ *H04L 67/55* (2022.05); *H04L 65/61* (2022.05); *H04L 65/613* (2022.05);
(Continued)

(58) Field of Classification Search
CPC ..... H04L 65/61; H04L 65/613; H04L 65/762; H04L 67/55; H04L 67/02; H04L 67/568; H04L 67/1097
See application file for complete search history.

(56) References Cited

U.S. PATENT DOCUMENTS

2010/0205148 A1*  8/2010  Leblanc ............... H04L 67/55
                                                      707/628
2011/0087794 A1    4/2011  Li et al.
(Continued)

FOREIGN PATENT DOCUMENTS

EP    3001688 A1    3/2016
EP    3113442 B1    5/2019
(Continued)

OTHER PUBLICATIONS

Armstrong, Nicholas "Just-In-Time Push Prefetching: Accelerating the Mobile Web", Waterloo, Ontario, CA, 2011 (Year: 2011).*
(Continued)

*Primary Examiner* — David R Lazaro
*Assistant Examiner* — Robert A Shaw
(74) *Attorney, Agent, or Firm* — Ballard Spahr LLP

(57) ABSTRACT

The disclosure relates generally to providing content from a source to a user device. In one implementation, a source such as a server receives a request for a master manifest file. The server may identify one or more other manifest files and at least one data block associated with the content. The other manifest files can include manifest files referenced by the master manifest file, or can include manifest files associated with related content. The requested master manifest, the one or more other manifest files, and the at least one data block can be pushed to the user device.

44 Claims, 7 Drawing Sheets

(51) Int. Cl.
  *H04L 65/613* (2022.01)
  *H04L 65/75* (2022.01)
  *H04L 67/02* (2022.01)
  *H04L 67/1097* (2022.01)
  *H04L 67/568* (2022.01)

(52) U.S. Cl.
  CPC ............ *H04L 65/762* (2022.05); *H04L 67/02* (2013.01); *H04L 67/568* (2022.05); *H04L 67/1097* (2013.01)

(56) References Cited

U.S. PATENT DOCUMENTS

| | | | |
|---|---|---|---|
| 2013/0239145 | A1 | 9/2013 | Broome et al. |
| 2014/0032777 | A1 | 1/2014 | Yuan et al. |
| 2014/0149557 | A1 | 5/2014 | Lohmar et al. |
| 2014/0280781 | A1 | 9/2014 | Gregotski |
| 2014/0344391 | A1 | 11/2014 | Varney et al. |
| 2015/0007239 | A1 | 1/2015 | Cranman et al. |
| 2015/0019676 | A1 | 1/2015 | Fablet et al. |
| 2015/0334431 | A1 | 11/2015 | Bjordammen et al. |
| 2015/0381690 | A1 | 12/2015 | Schmidt et al. |
| 2016/0028646 | A1* | 1/2016 | Fablet ............... H04L 47/80 709/226 |
| 2016/0127440 | A1 | 5/2016 | Gordon |
| 2016/0182593 | A1* | 6/2016 | Denoual ........... H04N 21/2353 709/219 |
| 2016/0182600 | A1 | 6/2016 | Swaminathan et al. |
| 2016/0191664 | A1* | 6/2016 | Balakrishnan ...... H04L 67/1097 709/203 |
| 2016/0198012 | A1 | 7/2016 | Fablet et al. |
| 2016/0205164 | A1 | 7/2016 | Schmidt et al. |
| 2016/0255397 | A1* | 9/2016 | Langan ............. H04N 21/4334 725/89 |
| 2016/0294898 | A1 | 10/2016 | Wheelock |
| 2016/0316234 | A1* | 10/2016 | Casey .................. H04N 21/437 |
| 2016/0337424 | A1 | 11/2016 | Mandyam |
| 2017/0006081 | A1 | 1/2017 | Grandl |
| 2017/0111463 | A1 | 4/2017 | Maze et al. |
| 2017/0111665 | A1 | 4/2017 | Suryanarayanan et al. |
| 2017/0134466 | A1 | 5/2017 | Giladi |
| 2017/0171287 | A1 | 6/2017 | Famaey |
| 2017/0188054 | A1* | 6/2017 | Ma ....................... H04L 67/563 |
| 2017/0230442 | A1 | 8/2017 | Denoual et al. |
| 2017/0238040 | A1 | 8/2017 | Huysegems et al. |
| 2017/0280178 | A1 | 9/2017 | Sun |
| 2017/0289639 | A1 | 10/2017 | Reisner |
| 2017/0311046 | A1* | 10/2017 | Delmas ................. H04L 65/61 |
| 2017/0353768 | A1* | 12/2017 | Muvavarirwa ............................. H04N 21/234309 |
| 2018/0013845 | A1 | 1/2018 | Denoual et al. |
| 2018/0063213 | A1* | 3/2018 | Bevilacqua-Linn ........................ H04L 41/0654 |
| 2018/0227379 | A1* | 8/2018 | Fablet ................ H04L 67/568 |
| 2018/0262419 | A1* | 9/2018 | Ludin .................. H04L 45/24 |
| 2018/0359297 | A1* | 12/2018 | Mihály .................. H04L 65/80 |
| 2019/0014358 | A1* | 1/2019 | Takabayashi ...... H04N 21/4621 |
| 2019/0045260 | A1 | 2/2019 | Klenner ............ H04N 21/47202 |
| 2019/0173939 | A1* | 6/2019 | Lewis .................... G06Q 50/01 |
| 2019/0222879 | A1* | 7/2019 | Jones ............... H04N 21/23439 |
| 2021/0105333 | A1* | 4/2021 | Chen ..................... H04L 67/02 |

FOREIGN PATENT DOCUMENTS

| | | |
|---|---|---|
| GB | 2534617 A | 8/2016 |
| GB | 2516112 B | 10/2016 |
| GB | 2516116 B | 10/2017 |
| GB | 2551674 B | 4/2018 |
| GB | 2554877 B | 3/2021 |
| WO | 2011090715 A2 | 7/2011 |
| WO | 2015004276 A2 | 1/2015 |

OTHER PUBLICATIONS

Wei et al, Low Latency Live Video Streaming over HTTP 2..0, NOSSDAV'14, Mar. 19-21, 2014, ACM, 2014 (Year: 2014).*

U.S. Appl. No. 15/491,662 (2018/0309840), filed Apr. 19, 2017 (Oct. 25, 2018), Cory Zachman (Comcast Cable Communications, LLC).

Mueller et al, Dynamic Adaptive Streaming Over HTTP/2.0 , IEEE International Conference on Multimedia and Expo (ICME ), IEEE, 2013 (Year: 2013).

* cited by examiner

200

```
<?xml version="1.0"?>
<MPD xmlns="urn:mpeg:dash:schema:mpd:2011" profiles="urn:mpeg:dash:profile:full:2011">
    <BaseURL>main/</BaseURL>
    <VariantList>
        <Variant id="1080p" bandwidth="6800000">
            <VariantURL media="1080p.m3u8"/>          ← 204
        </Variant>
        <Variant id="720p" bandwidth="3200000">
            <VariantURL media="720p.m3u8"/>
        </Variant>                                    ← 202
    </VariantList>
</MPD>
```

```
<?xml version="1.0"?>
<MPD xmlns="urn:mpeg:dash:schema:mpd:2011" profiles="urn:mpeg:dash:profile:full:2011" minBufferTime="PT1.5S">
    <Period duration="PT9M">
        <BaseURL>main/</BaseURL>
        <VariantSet mimeType="video/mp2t">
            <!-- 1080p Representation at 6.8 Mbps -->
            <Variant id="1080p" bandwidth="6800000" width="1920" height="1080">
                <BaseURL>1080/</BaseURL>
                <SegmentTemplate media="segment-$Number$.ts" timescale="90000">
                    <VariantIndex sourceURL="representation-index.sidx"/>
                </SegmentTemplate>
            </Representation>
        </AdaptationSet>                                                            ← 212
    </Period>
</MPD>
```

```
<?xml version="1.0"?>
<MPD xmlns="urn:mpeg:dash:schema:mpd:2011" profiles="urn:mpeg:dash:profile:full:2011" minBufferTime="PT1.5S">
    <Period duration="PT9M">
        <BaseURL>main/</BaseURL>
        <AdaptationSet mimeType="video/mp2t">
            <BaseURL>video/</BaseURL>
            <!-- 720p variant at 3.2 Mbps -->
            <Variant id="720p" bandwidth="3200000" width="1280" height="720">
                <BaseURL>720/</BaseURL>
                <SegmentList timescale="90000" duration="5400000">
                    <VariantIndex sourceURL="representation-index.sidx"/>
                    <SegmentURL media="segment-1.ts"/>
                    <SegmentURL media="segment-2.ts"/>
                    <SegmentURL media="segment-3.ts"/>
                    <SegmentURL media="segment-4.ts"/>
                    <SegmentURL media="segment-5.ts"/>
                    <SegmentURL media="segment-6.ts"/>
                    <SegmentURL media="segment-7.ts"/>
                    <SegmentURL media="segment-8.ts"/>
                    <SegmentURL media="segment-9.ts"/>
                    <SegmentURL media="segment-10.ts"/>   ← 222
                </SegmentList>
            </Variant>
        </AdaptationSet>
    </Period>
</MPD>
```

FIG. 2C

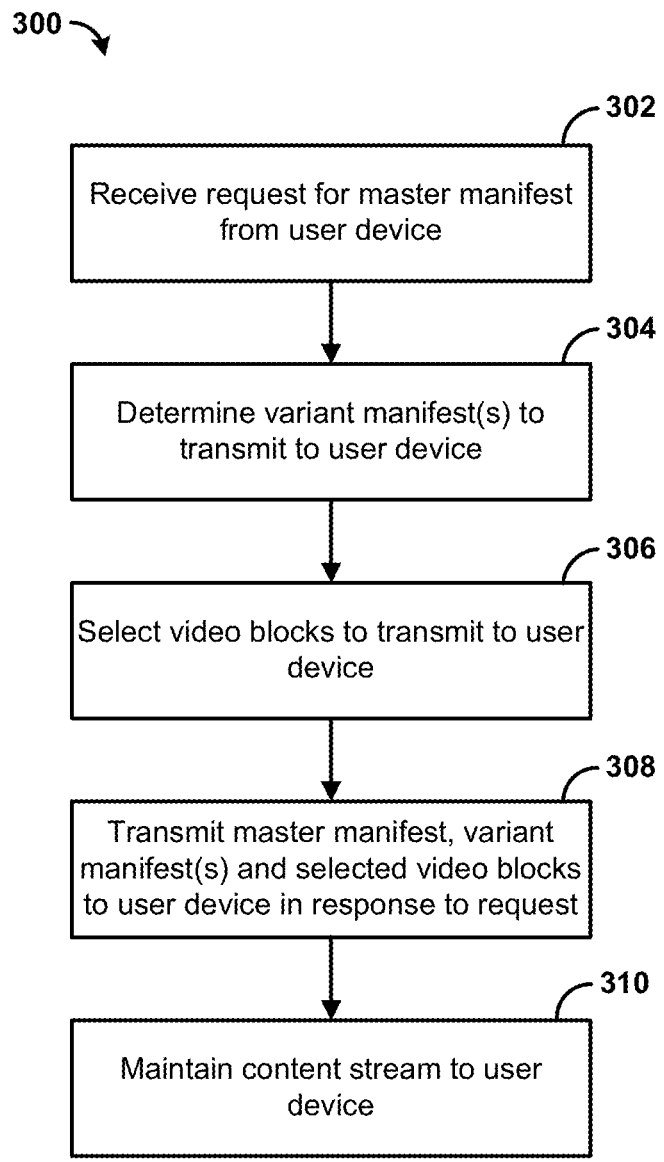

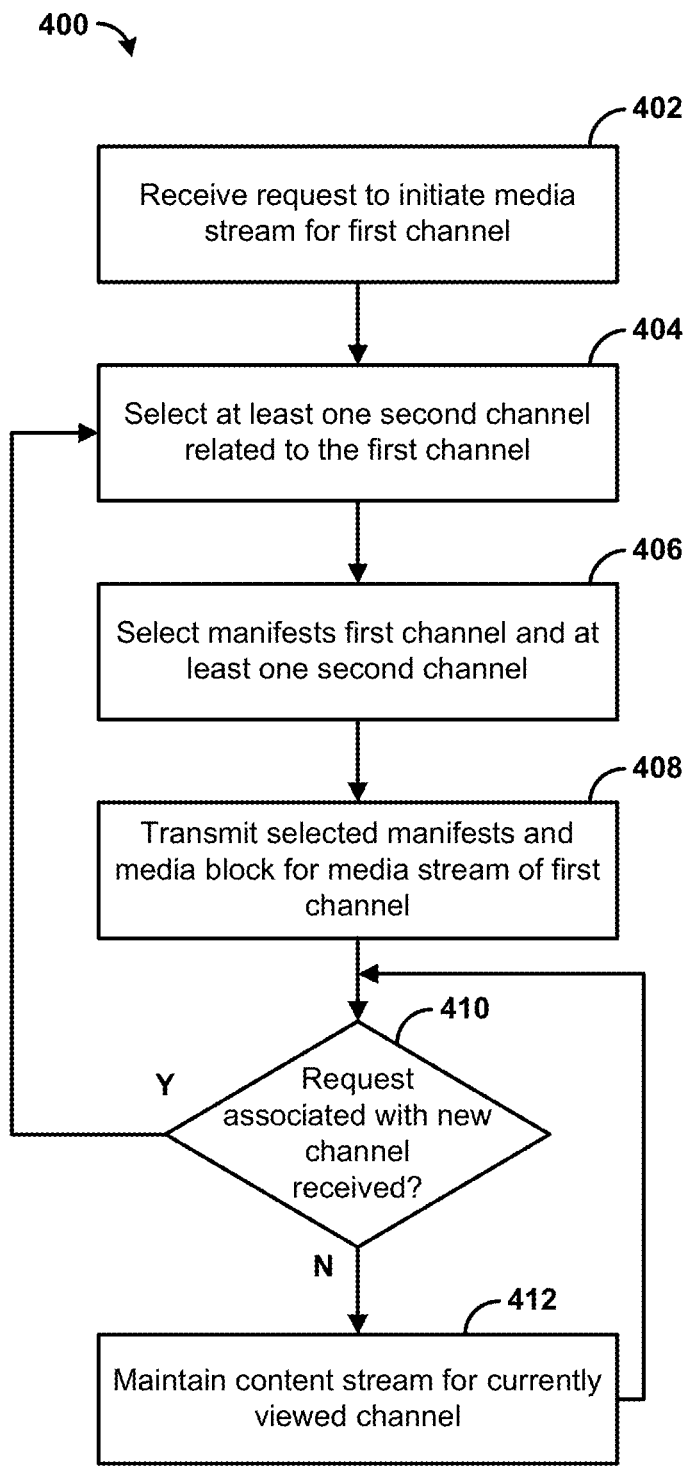

METHODS AND SYSTEMS FOR CONTENT DELIVERY USING SERVER PUSH

CROSS REFERENCE TO RELATED PATENT APPLICATION

This application is a continuation of U.S. application Ser. No. 15/491,662, filed Apr. 19, 2017, which is herein incorporated by reference in its entirety.

BACKGROUND

Content delivery systems use manifest files to direct user devices to content streams. In variable bitrate streaming, a manifest file may reference multiple variant manifest files facilitating access to content encoded in the available bitrates. In systems requiring a user to request a master manifest file, then use the master manifest file to request a variant manifest file, and then use the variant manifest file to request video content, a user experiences delay in content presentation due to the round-trip time caused by the requests and responses.

SUMMARY

It is to be understood that both the following general description and the following detailed description are exemplary and explanatory only and are not restrictive. Provided are methods and systems for content delivery using server push. Server push can comprise a transmission of data to a user device, e.g., a client device, without that data being requested by the user device. In an aspect of the disclosure, a user device (e.g., a set top box, mobile device, or other computing device) can send a request for a master manifest file for a given content stream. A remote computing device (e.g., a server) can determine one or more variant manifest files associated with the master manifest file. In an aspect, the server may also select one or more portions of content. The master manifest file, variant manifest files, and selected content portions can be transmitted to the client in response to the request for the master manifest file. As the user device has not yet requested the variant manifest files and content portions, the server may transmit the variant manifest files and content portions using a push data transfer, such as Hypertext Transfer Protocol 2.0 server push. Thus, the user device need not be delayed by additional round trips for requesting the variant manifest files and content portions separately.

Additionally, in an aspect, the server may determine a channel currently viewed by a user device, and determine one or more channels related to the currently viewed channel. The server can select manifest files associated with these related channels, including master manifest files and variant manifest files, and transmit them to the user device without them being requested using a push transmission. If a user signals to a user device to switch to a related channel for which the manifest files have already been downloaded, the time before content begins rendering is reduced as the user device does not need to request any manifest files before beginning to request content portions from the server.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2A is an example representation of a master manifest file;

FIG. 2B is an example representation of a variant manifest file;

FIG. 2C is an example representation of a variant manifest file;

FIG. 3 is an example communications flow diagram;

FIG. 4 is an example communications flow diagram; and

DETAILED DESCRIPTION

Figure 1:
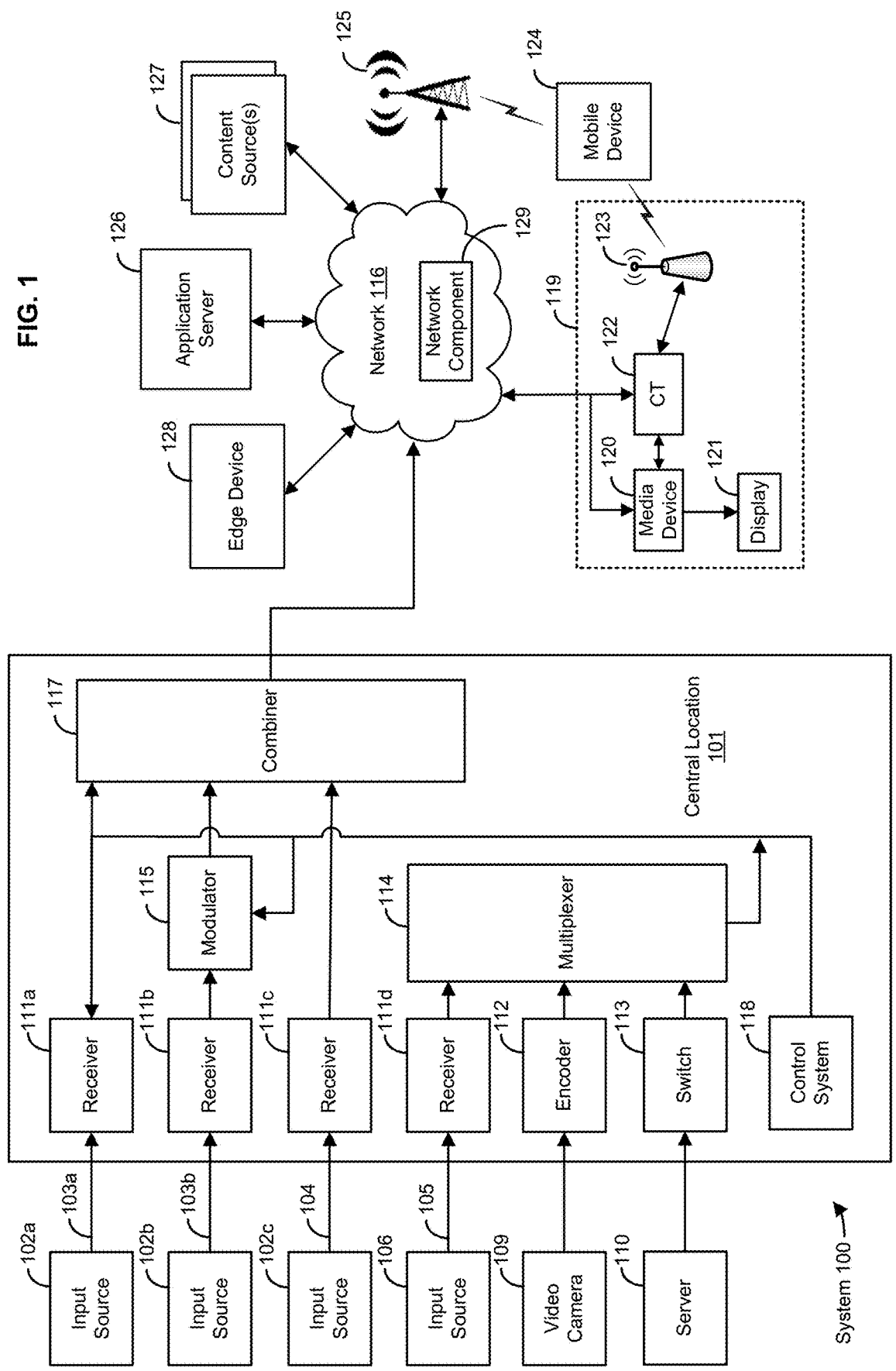
FIG. 1 is an example diagram of a content delivery network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4 k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to reducing a delay between the time a user selects a content stream for rendering and the time that content begins rendering on a user device. Current approaches for content streaming, such as video content streaming, require a user device to request a manifest file for a given stream from a remote computing device (e.g., a server). The manifest file can include a master manifest file, e.g. a top-level manifest file. The master manifest file serves to identify one or more variant manifest files, each of the variant manifest files corresponding to a bitrate, language, resolution, or other variation for a particular content item streamed via the content stream. The variant manifest files can then serve to identify content portions of a streamed content item. Variant manifest files can include Uniform Resource Locators (URLS), file identifiers, or other data from which requests can be generated for portions of content for the given version. For example, each variant manifest file can correspond to a particular bitrate version of a content item. Thus, a plurality of variant manifest files can facilitate variable bitrate streaming by facilitating access to the various bitrate versions of a content item streamed to a user. Using the master manifest file, the user device then requests a variant manifest file from the server. After receiving the variant manifest file, the user device requests a content portion for the stream as referenced in the variant manifest file.

In the approach described above, the user device must send a series of requests to the server, waiting for the respective response to each request before sending the next request, in order to eventually receive content for rendering. As the user device must wait the full round trip time for each request and response pair in sequence, a user of the user device experiences a delay between the time the initial request for the master manifest file was sent and the time that content begins rendering.

In an aspect of the present disclosure, a server can receive a request for a master manifest file for a content item to be streamed via a content stream. The server can select one or more of the variant manifest files referenced by the master manifest file. In an aspect, the server can also select one or more content portions referenced by one of the variant manifest files. In response to a request for the master manifest file, the server can transmit the requested master manifest file, the selected one or more variant manifest files, the selected content portions, combinations thereof, and the like, to the user device. As the variant manifest files and/or content portions were not requested by the user device, the server may use a server push to transmit the variant manifest files and/or content portions. In an aspect, the user device can then store the variant manifest files and/or content portions in a user device cache. When an application executed in the user device generates a request for a variant manifest file or content portion already stored in the cache, the application experiences a cache hit, and retrieves the requested content from the cache instead of transmitting a request to the server. This eliminates the round trip time between the user device and the server resulting from initially requesting the variant manifest file and content portions, thereby reducing the delay until content can begin rendering on the user device.

In another aspect, the server can determine a stream currently accessed by a user device, such as a currently viewed channel. Based on the currently viewed channel, the server can determine one or more related channels. In an aspect, the related channels can include one or more recently or previously accessed channels. In another aspect, the related channels can include subsequent or preceding channels in a listing of channels. In another aspect, the related channels can include channels transmitting content similar or otherwise related to the content transmitted on the currently viewed channel. The server can then push a master manifest file and one or more variant manifest files for each of the related channels to the user device. If a user selects one of the related channels, the user device need not request a master manifest file or variant manifest file from the server as this data is already stored in the cache of the user device. This reduces the delay in rendering content from the selected channel as the user switches between channels in the user device.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 116 at one or more of the user locations. At the user location 119, a media device 130 can demodulate and/or decode, if needed, the signals for display on a display device 131, such as on a television set (TV) or a computer monitor. For example, the media device 130 can comprise a demodulator, decoder, frequency tuner, and/or the like. The media device 130 can be directly connected to the network (e.g., for communications via in-band and/or out-of-band signals of a content delivery network) and/or connected to the network 116 via a communication terminal 122 (e.g., for communications via a packet switched network). The media device 130 can comprise a set-top box, a digital streaming device, a gaming device, a media storage device, a digital recording device, a combination thereof, and/or the like. The media device 130 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 130, the display device 131, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 130, and the display device 131 can be implemented as a single device.

In an aspect, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

In an aspect, the system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 130, the display device 131, and/or the like. The application device 126 can run one or more application services to provide data, handle requests, and/or otherwise facilitate operation of applications for the user.

In an aspect, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In an aspect, the network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

In an exemplary embodiment, the methods and systems disclosed can be located within the application server 126, content source 127, or edge device 128. For example, any of the application server 126, content source 127, or edge device 128 may serve as a server relative to a user device, such as a media device 130 or mobile device 124, and implement the server push of manifest files and content portions to the respective user device. For example, a user device (e.g., the media device 130 or the mobile device 124)

can transmit a request for a master manifest file to a server (e.g., the application server 126, the content source 127, or the edge device 128). In response to the request, the application server 126, the content source 127, or the edge device 128 can select one or more variant manifest files associated with the master manifest, as described above. The application server 126, the content source 127, or the edge device 128 can also select one or more content portions, as described above. The application server 126, the content source 127, or the edge device 128 can then transmit the requested master manifest, the selected one or more variant manifest files, and/or the selected one or more content portions to the requesting media device 130 or the mobile device 124. As the media device 130 or the mobile device 124 did not request the selected one or more variant manifest files or the selected one or more content portions, the selected one or more variant manifest files or the selected one or more content portions can be transmitted to the media device 130 or the mobile device 124 using a server push. The media device 130 or the mobile device 124 can then provide the master manifest file to an application or other process that generated the request for the master manifest, and stores the selected one or more variant manifest files and/or the selected one or more content portions in a cache. When an application executed in the media device 130 or the mobile device 124 generates a request for the one or more variant manifest files or the one or more content portions in the cache, the requested variant manifest file or content portion is loaded from the cache without transmission over the network 116, eliminating the round trip time required to request and receive the requested variant manifest file or content portion.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

The output of a single MPEG audio and/or video coder is called a transport stream comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi program transport stream. A multi program transport stream has a program clock reference (PCR) mechanism that allows transmission of multiple clocks, one of which is selected and regenerated at the decoder.

A multi program transport stream is more than just a multiplex of audio and video PESs. In addition to the compressed audio, video and data, a transport stream includes metadata describing the bit stream. This includes the program association table (PAT) that lists every program in the multi program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

FIG. 2A is a representation of an example master manifest file 200. The master manifest file 200 can facilitate access to a stream, such as a variable bitrate content stream. For example, master manifest file 200 can identify variant manifest files each corresponding to different bitrate versions of content for a stream. Here, the master manifest file 200 includes entries 202 and 204. Entry 202 corresponds to a 1080p version of content for a given stream, and includes a file identifier for a manifest file for the 1080p version of content. Entry 204 corresponds to a 720p version of content for a given stream, and includes a file identifier for a manifest file for the 720p version of content. A user device can generate requests for the variant manifest files referenced in the master manifest file 200 based on the file identifiers of the respective entries 202 and 204. In this example, the master manifest file 200 can be considered a "master," "parent," or "top level" manifest file as it references other manifest files, but is not itself referenced by another manifest file. The variant manifest files identified in the master manifest file 200 (described below as variant manifest files 210 and 220) can then be considered "children" or "lower level" manifest files relative to the master manifest file 200.

FIG. 2B is a representation of an example variant manifest file 210. In this example, the variant manifest file 210 corresponds to a manifest referenced by entry 202 in the master manifest file 200. Included in the variant manifest file 210 is a manifest template 212 defining a naming convention for content portions encoded at 1080p. Thus, a user device generating a request for one or more content portions would reference the manifest template 212 to dynamically generate the request.

FIG. 2C is a representation of an example variant manifest file 220. In this example, the variant manifest file 220 corresponds to a manifest referenced by the entry 204 in the master manifest file 200. Included in the variant manifest file 220 is a list 222 of identifiers for content portions encoded at 720p. Thus, a user device generating a request for one or more content portions would reference the list 222 to identify the file name for the content portion to be requested. The request would then identify the requested content portion based on the identifier included in the list.

FIG. 3 is a flowchart of an example method 300. Beginning with step 302, a server can receive a request from a user device for a master manifest file for a given content stream. The request may be transmitted by the user device in response to an indication from a user to access a particular content stream, linear content channel, or other data stream. Next, in step 304, the server can determine one or more variant manifest files to be transmitted to the user device. In an aspect, the master manifest file may include references to one or more variant manifest files. The variant manifest files may be referenced as a network address such as a Uniform Resource Locator (URL) or other network address as can be appreciated. Each of the variant manifest files may correspond to variant versions of content data in the requested content stream, and may include URLs, network addresses, or other references facilitating access to content portions of the respective variants by a user device. Accordingly, each of the variant versions may vary by one or more attributes, such as a bitrate, a resolution, a language, a content rating, or other attributes.

In an aspect, the server can select one or more variant manifest files referenced in the master manifest file. In an aspect, this can be performed according to a specification adhered to by the user device. For example, when a user device initially accesses a content stream, the specification can dictate that the user device first requests content portions corresponding to a variant manifest file first listed in the master manifest file. Accordingly, the server may select the variant manifest file listed first in the master manifest file. In another aspect, the server can select a variant manifest file according to a user device type. The user device type may be indicated in a device identifying token, in a user or account preference, in the request for the master manifest file, or otherwise indicated. For example, the server can select the variant manifest file as corresponding to a bitrate associated with the bandwidth of a connection to the user device. In another aspect, a user device of a given device type may implement one or more rules to determine which variant in a master manifest file will be requested first. For example, a mobile user device may first select a variant manifest file corresponding to a lowest bitrate, while a set top box user device may select a variant manifest file corresponding to a predefined bitrate. The server, knowing the device type of the user device requesting the manifest file, can predictively select the variant manifest file based on the rule set used by the user device. In another aspect, the server may select all variant manifest files referenced in a master manifest file.

Next, in step 306, the server selects one or more content portions of the given content stream corresponding to one of the selected variant manifest files. In an aspect, the selected content portions may correspond to one or more segments of content in a segmented content stream. In aspects where the server has selected a single variant manifest file in step 304, the selected content portions can correspond to the selected variant manifest file. In aspects where the server has selected multiple variant manifest files in step 304, the selected content portions can correspond to one of the variant manifest files determined according to an approach described above with respect to step 304. For example, in an aspect, the server can select all variant manifest files for transmission to a user device, and select content portions corresponding to one of the selected variant manifest files based on a specification of the user device, user device type, or another approach.

After selecting one or more variant manifest files and one or more content portions, in step 308, the server can transmit the requested master manifest files, the variant manifest files, and the selected content portions to the user device in response to the request for the master manifest file. As the user device has only requested the master manifest file, at least the variant manifest files and the selected content portions can be transmitted to the user device using a server push. This can include an HTTP 2.0 server push operation, or another operation allowing transmission of data to a user device without the transmitted data being requested as can be appreciated.

In step 310 the server maintains the content stream to the user device. This includes responding to requests for variant manifest files from the user device according to changes in bandwidth, user preferences or selections, or other criteria. This also includes transmitting content portions requested by the user device.

FIG. 4 is a flowchart 400 of an example method. At step 402, a server can receive a request to initiate a media stream associated with a first channel. In an aspect, receiving a request to initiate the media stream can include a request for a master manifest file associated with the media stream. For example, a user of a set top box can indicate that the set top box should be tuned to a particular channel. In this example, the set top box would generate a request for a master manifest file for the requested channel. A server would then receive the request for the master manifest file of the requested channel. As a further example, a user can enter a channel number for ESPN into a set top box. The set top box would then request a master manifest file for ESPN from the server.

In step 404 the server can determine at least one second channel related to the first channel. In an aspect, determining at least one second channel related to the first channel can include determining one or more channels viewed prior to the currently viewed channels. In another aspect, determining at least one second channel related to the first channel can include determining that a user is iterating through a channel listing incrementally or decrementally. In such an aspect, if the user is incrementing through the channel listing, determining at least one second channel related to the first channel can include selecting the next N channels succeeding the first channel. Determining at least one second channel related to the currently viewed channel can also include selecting the next N channels preceding the first channel when the user is decrementing through the channel listing. In another aspect, determining at least one second channel related to the first channel can include determining one or more channels transmitting content similar or related to content of the first channel.

Referring back to the example set forth in step 402, the user of the set top box has indicated that the set top box should tune to a first channel, causing the server to receive a request to initiate the media stream associated with the first channel to the set top box. The server can then identify channels related to the channel indicated by the user of the set top box according to the approaches described above. For example, given a set top box tuned to ESPN, the server can identify ESPN2 and/or Fox Sports as channels related to ESPN, as each channel relates to sports.

After determining the at least one second channel related to the first channel, in step 406, the server selects one or more manifest files for each of the at least one second channel related to the first channel. In an aspect, the server can select a master manifest file for each of the at least one second channel related to the first channel. In an aspect, the server can also select one or more variant manifest files referenced in the master manifest file(s) for each of the at least one second channel related to the first channel. In an aspect, selecting one or more variant manifest files referenced in the master manifest file for each of the at least one second channel can be performed according to a specification adhered to by the user device. For example, when initially accessing a channel, the specification can dictate that the user device first requests content portions corresponding to a variant manifest file first listed in the master manifest file. Accordingly, for each related channel, the server may select the variant manifest file listed first in the master manifest file. In another aspect, the server can select a variant manifest file according to a user device type. For example, the server can select the variant manifest file as corresponding to a bitrate associated with the bandwidth of a connection to the user device.

In another aspect, a user device of a given device type may implement one or more rules to determine which variant in a master manifest file will be requested first. For example, when first accessing a channel, a mobile user device may first select a variant manifest file corresponding to a lowest bitrate, while a set top box user device may select a variant manifest file corresponding to a predefined bitrate. The server, knowing the device type of the user device requesting the manifest file, may predictively select the variant manifest file based on the rule set used by the user device. In another aspect, for each of the at least one second channel, the server may select all variant manifest files referenced in a corresponding master manifest file.

As an example, given a set top box accessing ESPN, the server may select, for each of the at least one second channels related to the first channel, variant manifest files corresponding to a predefined bit rate of the set top box. As another example, given a set top box accessing ESPN, the server may select all variant manifest files referenced in the respective master manifest files of the at least one second channel related to the first channel.

In step 408, the server can transmit the selected manifest files and at least one media block for the media stream of the first channel to the user device. Thus, the user device will receive one or more manifest files associated with the first channel requested by the user device, and one or more manifest files for at least one second channel related to the first channel. In an aspect, the selected manifest files and/or the at least one media block can be transmitted to the user device using a server push. As the user device has yet to request the selected master manifest file and/or variant manifest files for the related at least one second channel, the server can use a server push or other transmission approach allowing the transmission of unrequested data to a user device. In an aspect, the transmitted master manifest files or variant manifest files may be generated or modified by the server to include a time-to-live such that the transmitted manifest files are deleted from a user device cache by the user device after a predefined time period if not requested from the user device cache. In an aspect, the time-to-live may correspond to a segment length of a content segment of the content stream. For example, in an aspect, a content delivery network may encode a content stream into two-second segments. In such an aspect, the time-to-live of a manifest file pushed to the user device would be two seconds. In another aspect, the server or another portion of a content delivery network may dynamically regenerate master or variant manifest files at a predefined interval. In such an aspect, the time-to-live of a manifest file pushed to the user device would be less than or equal to the predefined interval.

As an example, a set top box is accessing ESPN, and the server has identified ESPN2 and Fox Sports as related channels. In an aspect, the server can transmit master manifest files and/or variant manifest files for ESPN2 and Fox Sports to the set top box. In an aspect, these transmitted manifest files can have a time-to-live less than or equal to a segment length of a content stream (e.g., a two second time-to-live for a two second segment length). In another aspect, the server can be configured to regenerate master manifest files and/or variant manifest files for the related channels (ESPN2 and Fox Sports) at a predefined interval of ten seconds. In such an aspect, the transmitted master manifest files can have a time-to-live less than or equal to ten seconds.

In step 410 the server can determine if a request has been received that is associated with a new channel other than the first channel. For example, the user of the set top box described in preceding steps may perform a channel change. The set top box would then generate a request associated with the new channel. However, as the server had previously pushed manifest files for related channels to the set top box, the server would only receive the request for the new channel if a manifest file for the new channel was not included in the pushed manifest files. This could occur if the new channel was not identified as a related channel, or if a pushed manifest for the new channel had an expired time to live. As an example, a set top box tuned to ESPN has received master manifest files for ESPN2 and Fox Sports from the server. If a user of the set top box enters a channel number for ESPN2, the set top box will generate a request for the master manifest file for ESPN2. The master manifest file can then be loaded from a cache of the set top box in response to the request, thus saving a round-trip time to the server. However, if the user of the set top box enters a channel number for CNN, a channel whose master manifest files and/or manifest files were not pushed by the server to the set top box, the set top box would then transmit a request to the server for the master manifest file for CNN. As another example, if the user of the set top box enters a channel number for ESPN2 but the time-to-live of the pushed manifest files has expired, the set top box would then transmit a request to the server for the master manifest file for ESPN2.

In an aspect, receiving a request associated with a new channel other than the first channel can include receiving a request for a master manifest file which is indicative of a user device requesting access to a new channel. For example, if a user device attempts to access a channel other than a related channel for which a master manifest file has been pushed by the server, or if a user device attempts to access a channel after its corresponding manifest file has been deleted from a user device cache, the user device can request the master manifest file from the server.

In another aspect, the request associated with a new channel can include a request for a content portion associated with a channel distinct from the first. For example, if a user device begins access to a related channel (i.e. at least one second channel) for which a master and/or variant manifest file has been pushed by the server, the server would not receive a request for the master manifest file as it is already stored in the user device cache. Instead, the server would receive a request for a content portion based on the master and/or variant manifest files pushed to the user device.

If a request associated with a new channel is not received the method advances to step 412, where the server can maintain the content stream to the user device for the currently viewed channel. This includes responding to requests for variant manifest files from the user device according to changes in bandwidth, user preferences or selections, or other criteria. This also includes transmitting content portions or segments requested by the user device. If a request associated with a new channel is received, the process returns to step 404, whereby the new channel would serve as the first channel for purposes of the method 400.

Figure 5:
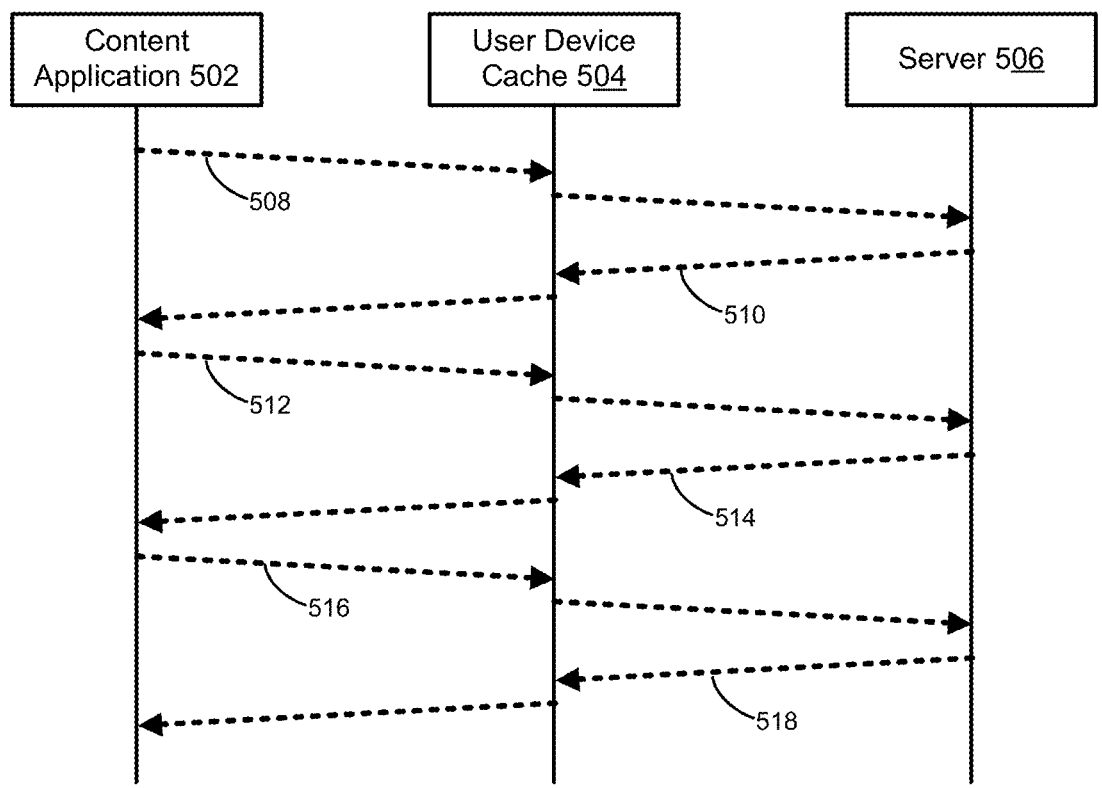
FIG. 5 is a flowchart depicting an example method.

FIG. 5 is a communications flow of a process for a user device accessing a content stream without the use of a server push of manifest files or content portions. Included in the communications flow is a content application 502 executed in a user device facilitating access to, and rendering of, content portions of a content item transmitted via a content stream. Also included is a user device cache 504 of the user device executing the content application 502. The user device is in network communication with a server 506. At time 508 the content application 502 requests access to a content stream served by the server 506 by generating a request for a master manifest file of the given stream. As the master manifest file is not present in the user device cache 504, the request is transmitted to the server 506. In response to this request, at time 510, the server transmits the requested master manifest file to the content application 502.

After receiving the master manifest file, the content application 502 selects a variant manifest file referenced in the master manifest file and generates a request for the selected variant manifest file at time 512. Again, as the selected variant manifest file is not stored in the user device cache 504, the request must be transmitted to the server 506. The server 506 transmits the requested variant manifest file to the content application at time 514.

Now having the master manifest file and a variant manifest file for the given stream, the content application 502 generates a request for a content portion according to the received variant manifest file. Again, as no content portion is stored in the user device cache 504, the request is transmitted to the server 506 at time 516. The server 506 transmits the requested content portion at time 518. In this approach, the content application 502 must wait the full round trip time to the server 506 after each request sent at times 508, 512, and 516, respectively, before beginning to render content after the content portion transmitted in time 518 is received.

Figure 6:
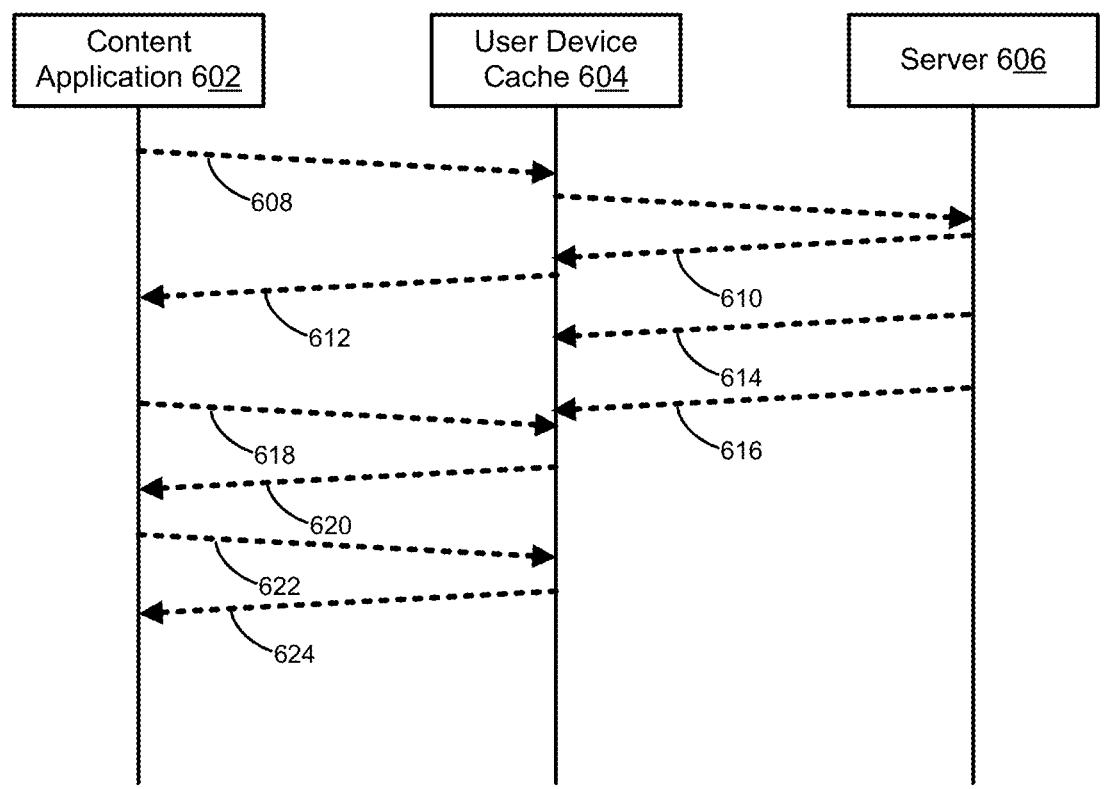
FIG. 6 is a flowchart depicting an example method.

FIG. 6 is a communications flow of a process for transmitting content to a user device or a user device accessing content. An application 602 is provided, which may be partially or fully executed in a user device environment. The application 602 may facilitate access to content, and also render content or provide rendering instructions for the content. Also included in the process is a user device cache 604, which may comprise one or more caches of the user device. The cache 604 may be accessed when executing the content application 602. The user device has a communication connection, e.g., via a network, with server 606. At time 608 the content application 602 requests access to content, to be delivered as a content stream, for example, where the content is managed (e.g., stored, administered, etc.) by the server 606. The content application 602 may generate a request for a master manifest file for the content. As the master manifest file is not present in the user device cache 604, the request is transmitted to the server 606. In response to this request, the server 606 selects one or more variant manifest files referenced in the master manifest file as is set forth above. The server 606 also selects one or more content portions for a selected variant manifest file. Then, at time 610, the server transmits the requested master manifest file to the user device, which is received by the content application 602 at time 612. The server 606 also transmits the one or more selected variant manifest files and portions of the content (requested in step 602) to the user device using a server push at times 614 and 616, respectively. As the content application 602 has yet to request the variant manifest files and content portions, this data is stored in the user device cache 604. It is understood that each of the variant manifest files and content portions can be transmitted as separate server pushes, or combinations thereof can be transmitted in a single server push.

After receiving the master manifest file, the content application 602 selects a variant manifest file referenced in the master manifest file and generates a request for the selected variant manifest file at time 618. Having been pushed by the server 606 at time 614, the requested variant manifest file is retrieved from the user device cache 604 at time 530, thereby eliminating the round trip time form the user device to the server 606 required when requesting the variant manifest file from the server 606. Using a URL or other reference in the variant manifest file, the content application 602 generates a request for a portion of content at time 522. Again, as the first portion of content has been pushed by the server 606 at time 616, the requested content portions are retrieved from the user device cache 604 at time 524, thereby eliminating the round trip time form the user device to the server 606 required when requesting the first portion of content from the server 606. The content application 602 can then begin rendering content on the user device 602 with a reduced delay due to fewer required round trip communications to the server 606. In an aspect, subsequent content portions of the stream can be retrieved from the server 606 by a request from the content application 602. Additionally, in an aspect, variant manifest files required by the content application 602 that were not initially pushed by the server 606 can also be retrieved from the server 606 by a request from the content application 602.

Figure 7:
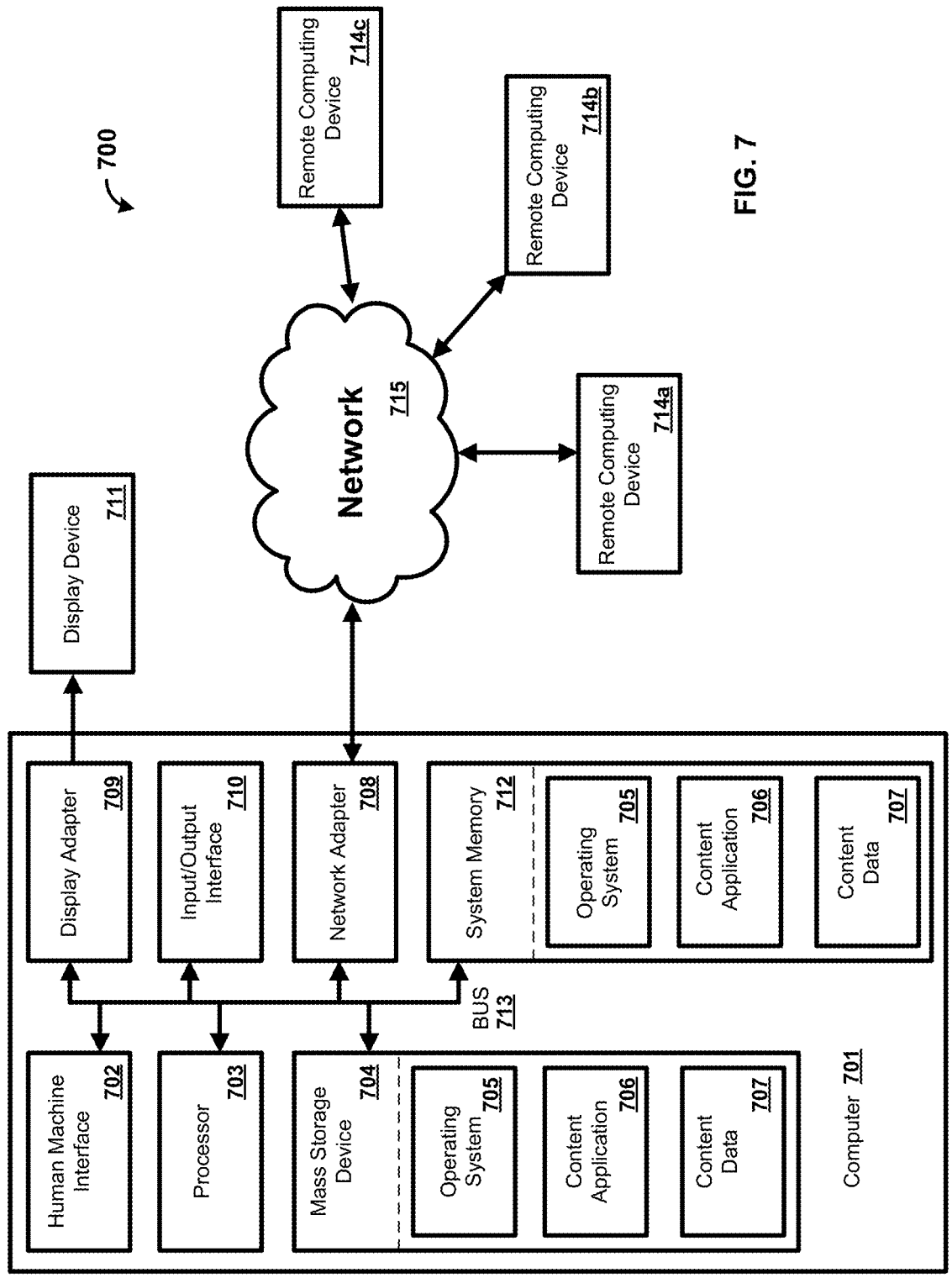
FIG. 7 is a block diagram of an example computing device.

In an exemplary aspect, the methods and systems can be implemented on a computer 701 as illustrated in FIG. 7 and described below. By way of example, the application server 126, content source 127, or edge device 128 of FIG. 1 can be a computer as illustrated in FIG. 7. As another example, the server 502 and server 602 of FIGS. 5 and 6, respectively, computer as illustrated in FIG. 7. Similarly, the methods and systems disclosed can utilize one or more computers to perform one or more functions in one or more locations.

FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the one or more processors 703, a mass storage device 704, an operating system 705, content application 706, content data 707, a network adapter 708, the system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the content data 707 and/or program modules such as the operating system 705 and the content application 706 that are immediately accessible to and/or are presently operated on by the one or more processors 703.

In another aspect, the computer 701 can also comprise other removable/non-removable, volatile/non-volatile computer storage media. By way of example, FIG. 6 illustrates the mass storage device 704 which can provide non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the content application 706. Each of the operating system 705 and the content application 706 (or some combination thereof) can comprise elements of the programming and the content application 706. The content data 707 can also be stored on the mass storage device 704. The content data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, the display device 711 can also be connected to the system bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714*a,b,c*. By way of example, a remote computing device can be a personal computer, portable computer, smartphone, a server, a router, a network computer, a peer device or other common network node, and so on. Logical connections between the computer 701 and a remote computing device 714*a,b,c* can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the one or more processors 703 of the computer. An implementation of the content application 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A system comprising:
a computing device configured to:
  determine, based on a request for a content item, a first manifest file comprising one or more references to one or more second manifest files, wherein the first manifest file facilitates delivery of a first portion of the content item,
  determine, based on the first manifest file, a second manifest file of the one or more second manifest files,
  determine, based on the second manifest file, a second portion of the content item;
  send, to a user device, the first portion of the content item and the first manifest file;
  and send, to the user device, via a server push, the second manifest file and the second portion of the content item; and
the user device configured to:
  receive the first portion of the content item and the first manifest file, and
  receive the second manifest file and the second portion of the content item.

2. The system of claim 1, wherein the computing device is configured to send the second manifest file and the second portion of the content item by pushing, based on a Hypertext Transfer Protocol (HTTP) 2.0 server push, the second manifest file and the second portion of the content item.

3. The system of claim 1, wherein the first manifest file comprises a top-level manifest file.

4. The system of claim 3, wherein the second manifest file comprises a variant manifest file referenced by the top-level manifest file.

5. The system of claim 3, wherein the first portion of the content item corresponds to a bit rate of a first entry in the top-level manifest file.

6. The system of claim 1, wherein the computing device is further configured to send, based on the request for the content item, a digital rights management license.

7. The system of claim 1, wherein the computing device is further configured to receive the request for the content item via a content delivery network.

8. The system of claim 1, wherein the computing device is further configured to receive the request for the content item from the user device.

9. One or more non-transitory computer-readable media storing processor-executable instructions that, when executed by at least one processor, cause the at least one processor to:
- determine, based on a request for a content item, a first manifest file comprising one or more references to one or more second manifest files, wherein the first manifest file facilitates delivery of a first portion of the content item to a user device;
- determine, based on the first manifest file, a second manifest file of the one or more second manifest files;
- determine, based on the second manifest file, a second portion of the content item;
- send, to the user device, the first portion of the content item and the first manifest file; and
- send, to the user device, the second manifest file and the second portion of the content item.

10. The non-transitory computer-readable media of claim 9, wherein the processor-executable instructions, when executed by the at least one processor, further cause the at least one processor to send the second manifest file and the second portion of the content item by pushing, based on a Hypertext Transfer Protocol (HTTP) 2.0 server push, the second manifest file and the second portion of the content item.

11. The non-transitory computer-readable media of claim 9, wherein the first manifest file comprises a top-level manifest file.

12. The non-transitory computer-readable media of claim 11, wherein the second manifest file comprises a variant manifest file referenced by the top-level manifest file.

13. The non-transitory computer-readable media of claim 11, wherein the first portion of the content item corresponds to a bit rate of a first entry in the top-level manifest file.

14. The non-transitory computer-readable media of claim 9, wherein the processor-executable instructions, when executed by the at least one processor, further cause the at least one processor to send, based on the request for the content item, a digital rights management license.

15. The non-transitory computer-readable media of claim 9, wherein the processor-executable instructions, when executed by the at least one processor, further cause the at least one processor to receive the request for the content item via a content delivery network.

16. The non-transitory computer-readable media of claim 9, wherein the processor-executable instructions, when executed by the at least one processor, further cause the at least one processor to receive the request for the content item from the user device.

17. A system comprising:
a computing device configured to:
- send, to a user device, based on a request for a content item, a first manifest file and a first portion of the content item, wherein the first manifest file facilitates delivery of the first portion of the content item, and
- send, to the user device, via a server push, a second manifest file and a second portion of the content item indicated by the second manifest file; and the user device configured to:
- receive the first manifest file and the first portion of the content item,
- receive the second manifest file and the second portion of the content item indicated by the second manifest file,
- store in a cache of the user device the second manifest file and the second portion of the content item, and
- cause output of at least one of the second portion of the content item from the cache or additional portions of the content item indicated by the second manifest file.

18. The system of claim 17, wherein the user device is further configured to receive, via the server push, additional manifest files, wherein the content item is associated with a first channel, and the additional manifest files comprise at least one manifest file associated with a second channel.

19. The system of claim 18, wherein the user device is further configured to delete, after a predefined time duration, the at least one manifest file associated with the second channel.

20. The system of claim 19, wherein the predefined time duration corresponds to a duration of the first portion of the content item.

21. The system of claim 17, wherein the user device is further configured to:
- determine that a manifest file associated with at least one portion of the content item is missing; and
- send a request for the missing manifest file.

22. The system of claim 17, wherein the first portion of the content item corresponds to a bit rate of a first entry in the first manifest file.

23. The system of claim 17, wherein the user device is further configured to receive the second manifest file and the second portion of the content item indicated by the second manifest file via a Hypertext Transfer Protocol (HTTP) 2.0 server push.

24. One or more non-transitory computer-readable media storing processor-executable instructions that, when executed by at least one processor, cause the at least one processor to:
- receive, by a user device, based on a request for a content item, a first manifest file, wherein the first manifest file facilitates delivery of a first portion of the content item to the user device;
- receive, by the user device, the first portion of the content item;
- receive, by the user device, via a server push, a second manifest file and a second portion of the content item indicated by the second manifest file;
- store in a cache of the user device the second manifest file and the second portion of the content item; and
- cause output of at least one of the second portion of the content item from the cache or additional portions of the content item indicated by the second manifest file.

25. The non-transitory computer-readable media of claim 24, wherein the processor-executable instructions, when executed by the at least one processor, further cause the at least one processor to receive, via the server push, additional manifest files, wherein the content item is associated with a first channel, and the additional manifest files comprise at least one manifest file associated with a second channel.

26. The non-transitory computer-readable media of claim 25, wherein the processor-executable instructions, when executed by the at least one processor, further cause the at least one processor to delete, after a predefined time duration, the at least one manifest file associated with the second channel.

27. The non-transitory computer-readable media of claim 26, wherein the predefined time duration corresponds to a duration of the first portion of the content item.

28. The non-transitory computer-readable media of claim 24, wherein the processor-executable instructions, when executed by the at least one processor, further cause the at least one processor to:

determine that a manifest file associated with at least one portion of the content item is missing; and send a request for the missing manifest file.

29. The non-transitory computer-readable media of claim 24, wherein the first portion of the content item corresponds to a bit rate of a first entry in the first manifest file.

30. The non-transitory computer-readable media of claim 24, wherein the processor-executable instructions, when executed by the at least one processor, further cause the at least one processor to receive the second manifest file and the second portion of the content item indicated by the second manifest file via a Hypertext Transfer Protocol (HTTP) 2.0 server push.

31. A system comprising:
a computing device configured to:
send, to a user device, based on a request for a content item, a first manifest file associated with the content item and an initial portion of the content item, and
send, to the user device, via a server push, a second manifest file referenced by the first manifest file and a second portion of the content item indicated by the second manifest file; and
the user device configured to:
receive the first manifest file associated with the content item and the initial portion of the content item
receive the second manifest file referenced by the first manifest file and the second portion of the content item indicated by the second manifest file, and
cause output of at least one of additional portions of the content item indicated by the second manifest file or the second portion of the content item.

32. The system of claim 31, wherein the at least one of additional portions of the content item correspond to at least one bitrate of the second manifest file.

33. The system of claim 31, wherein the user device is further configured to cause the output based on a request for the content item.

34. The system of claim 31, wherein the user device is further configured to receive, via another server push, the at least one of additional portions of the content item.

35. The system of claim 31, wherein the computing device is further configured to receive the request for the content item via a content delivery network.

36. The system of claim 31, wherein the computing device is further configured to receive the request for the content item from the user device.

37. The system of claim 31, wherein the user device is further configured to receive the second manifest file referenced by the first manifest file and the second portion of the content item indicated by the second manifest file via a Hypertext Transfer Protocol (HTTP) 2.0 server push.

38. One or more non-transitory computer-readable media storing processor-executable instructions that, when executed by at least one processor, cause the at least one processor to:
receive, based on a request for a content item, a first manifest file associated with the content item and an initial portion of the content item;
receive, via a server push, a second manifest file referenced by the first manifest file and a second portion of the content item indicated by the second manifest file; and
cause output of at least one of additional portions of the content item indicated by the second manifest file or the second portion of the content item.

39. The non-transitory computer-readable media of claim 38, wherein the at least one of additional portions of the content item correspond to at least one bitrate of the second manifest file.

40. The non-transitory computer-readable media of claim 38, wherein the processor-executable instructions, when executed by the at least one processor, further cause the at least one processor to cause the output based on a request for the content item.

41. The non-transitory computer-readable media of claim 38, wherein the processor-executable instructions, when executed by the at least one processor, further cause the at least one processor to receive via another server push, the at least one of additional portions of the content item.

42. The non-transitory computer-readable media of claim 38, wherein the processor-executable instructions, when executed by the at least one processor, further cause the at least one processor to receive the request for the content item via a content delivery network.

43. The non-transitory computer-readable media of claim 38, wherein the processor-executable instructions, when executed by the at least one processor, further cause the at least one processor to receive the request for the content item from a user device.

44. The non-transitory computer-readable media of claim 38, wherein the processor-executable instructions, when executed by the at least one processor, further cause the at least one processor to receive the second manifest file referenced by the first manifest file and the second portion of the content item indicated by the second manifest file via a Hypertext Transfer Protocol (HTTP) 2.0 server push.

* * * * *